US012576537B2

(12) United States Patent
Butler et al.

(10) Patent No.: US 12,576,537 B2
(45) Date of Patent: Mar. 17, 2026

(54) MODULAR ROBOT WITH POWER MANAGEMENT PLATFORM

(71) Applicant: Aristocrat Technologies, Inc., Las Vegas, NV (US)

(72) Inventors: Brett Butler, Austin, TX (US); Eric Santana, Austin, TX (US); Adam Loeckle, Argyle, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 145 days.

(21) Appl. No.: 18/473,055

(22) Filed: Sep. 22, 2023

(65) Prior Publication Data

US 2025/0100157 A1     Mar. 27, 2025

(51) Int. Cl.
*B25J 11/00*         (2006.01)
*B25J 9/00*          (2006.01)
*B25J 9/16*          (2006.01)

(52) U.S. Cl.
CPC ........... *B25J 11/003* (2013.01); *B25J 9/0009* (2013.01); *B25J 9/1666* (2013.01); *B25J 11/0045* (2013.01)

(58) Field of Classification Search
CPC .... B25J 11/003; B25J 11/0045; B25J 9/0009; B25J 9/1666
See application file for complete search history.

(56) References Cited

U.S. PATENT DOCUMENTS

| | | |
|---|---|---|
| 4,171,730 A | 10/1979 | Dow |
| 4,934,733 A | 6/1990 | Smith |
| 5,004,257 A | 4/1991 | Macisaac |
| 5,016,912 A | 5/1991 | Smith |
| 5,058,916 A | 10/1991 | Hicks |
| D351,866 S | 10/1994 | Freels |
| D378,224 S | 2/1997 | Brettschneider |
| D383,802 S | 9/1997 | Levy |

(Continued)

FOREIGN PATENT DOCUMENTS

| | | |
|---|---|---|
| CN | 101548300 A | 9/2009 |
| JP | 2006034823 A | 2/2006 |

OTHER PUBLICATIONS

Office Action (Non-Final Rejection) dated Nov. 3, 2021 for U.S. Appl. No. 17/212,780 (pp. 1-19).

(Continued)

*Primary Examiner* — Nhi Q Bui
(74) *Attorney, Agent, or Firm* — Greenberg Traurig, LLP

(57) ABSTRACT

This disclosure describes a system that, itself, includes a base subsystem. The base subsystem may include a mobility device that is configured to move the base subsystem along a surface. The system also may also include a set of sensors that are physically coupled to the base subsystem and are communicatively coupled to the mobility device in a manner than enables the system to navigate two or more different operational environments. The system may further include an upper subsystem that is coupled to the base subsystem and that includes a set of input devices. The system may also include a control circuit programmed to coordinate input received from the set of input devices with signals from the set of sensors to provide a user with a gaming experience within at least one of the operational environments. Other corresponding apparatuses and modular robot systems are also provided.

17 Claims, 12 Drawing Sheets

(56)  References Cited

U.S. PATENT DOCUMENTS

| | | | |
|---|---|---|---|
| D404,436 S | 1/1999 | Mcgahn | |
| D411,257 S | 6/1999 | Nolte | |
| 6,042,138 A | 3/2000 | Shreck | |
| 6,056,077 A | 5/2000 | Kobayashi | |
| D428,063 S | 7/2000 | Thomas | |
| D450,310 S | 11/2001 | Hedrick | |
| D473,899 S | 4/2003 | Jesus | |
| D492,734 S | 7/2004 | Karstens | |
| 7,222,000 B2 | 5/2007 | Wang | |
| D563,481 S | 3/2008 | Looks | |
| D587,319 S | 2/2009 | Moises Deiab | |
| D592,709 S | 5/2009 | Mccomb | |
| D612,432 S | 3/2010 | De Viveiros Ortiz | |
| D631,635 S | 1/2011 | Tuli | |
| 8,676,893 B1 | 3/2014 | Teller | |
| 8,886,383 B2 | 11/2014 | Hyde | |
| 8,994,591 B2 | 3/2015 | Dupray | |
| D762,613 S | 8/2016 | Garneau | |
| 9,411,337 B1 | 8/2016 | Theobald | |
| 9,489,490 B1 | 11/2016 | Theobald | |
| D774,029 S | 12/2016 | Kim | |
| 9,534,906 B2 | 1/2017 | High | |
| 9,535,421 B1 | 1/2017 | Canoso | |
| 9,649,766 B2 | 5/2017 | Stubbs | |
| 9,720,414 B1 | 8/2017 | Theobald | |
| 9,919,420 B1 | 3/2018 | Theobald | |
| D816,078 S | 4/2018 | Horn | |
| 10,044,464 B1 | 8/2018 | Bostick | |
| 10,328,836 B2 | 6/2019 | Purwin | |
| D872,768 S | 1/2020 | Morisawa | |
| D885,378 S | 5/2020 | Kochubievsky | |
| 10,737,377 B2 | 8/2020 | Fulop | |
| 10,755,522 B1 | 8/2020 | Pechinko | |
| 10,786,033 B2 | 9/2020 | Brown | |
| 10,835,810 B2 | 11/2020 | Doptis | |
| 11,046,562 B2 | 6/2021 | High | |
| D928,875 S | 8/2021 | Yang | |
| 11,090,811 B2 | 8/2021 | Beach | |
| 11,099,562 B1 | 8/2021 | Ebrahimi Afrouzi | |
| 11,209,832 B2 | 12/2021 | Deyle | |
| 11,209,887 B1 * | 12/2021 | Jung | G05D 1/0005 |
| 11,425,494 B1 | 8/2022 | Chatlani | |
| D962,958 S | 9/2022 | Collins | |
| 11,532,205 B2 | 12/2022 | Cupersmith | |
| 11,548,159 B1 | 1/2023 | Ebrahimi Afrouzi | |
| 2006/0009285 A1 | 1/2006 | Pryzby | |
| 2006/0045679 A1 | 3/2006 | Ostendorff | |
| 2007/0192910 A1 | 8/2007 | Vu | |
| 2007/0194170 A1 | 8/2007 | Ellison | |
| 2007/0198129 A1 | 8/2007 | Koselka | |
| 2008/0108424 A1 | 5/2008 | Baerlocher | |
| 2009/0106653 A1 | 4/2009 | Lee | |
| 2010/0145512 A1 | 6/2010 | Flessas | |
| 2011/0054686 A1 | 3/2011 | Lee | |
| 2013/0129086 A1 | 5/2013 | Tang | |
| 2013/0204993 A1 | 8/2013 | Uribe-Etxebarria Jimenez | |
| 2013/0331976 A1 | 12/2013 | Freeman | |
| 2013/0338525 A1 | 12/2013 | Allen | |
| 2013/0339146 A1 | 12/2013 | Goldberg | |
| 2014/0207282 A1 | 7/2014 | Angle | |
| 2014/0214556 A1 | 7/2014 | Willett | |
| 2014/0277847 A1 | 9/2014 | Cann | |
| 2014/0279733 A1 | 9/2014 | Djugash | |
| 2015/0042619 A1 | 2/2015 | Forti | |
| 2015/0080096 A1 | 3/2015 | Saunders | |
| 2015/0139766 A1 | 5/2015 | Cousins | |
| 2015/0158182 A1 | 6/2015 | Farlow | |
| 2015/0190927 A1 | 7/2015 | Sutherland | |
| 2015/0205298 A1 | 7/2015 | Stoschek | |
| 2015/0350569 A1 | 12/2015 | Espersen | |
| 2016/0328569 A1 | 11/2016 | Lee | |
| 2016/0328730 A1 | 11/2016 | Salamon | |
| 2016/0379256 A1 | 12/2016 | Salamon | |
| 2017/0136631 A1 | 5/2017 | Li | |
| 2017/0147322 A1 | 5/2017 | Vopni | |

| | | | |
|---|---|---|---|
| 2017/0148276 A1 | 5/2017 | Russell | |
| 2017/0213268 A1 | 7/2017 | Puehse | |
| 2017/0225336 A1 | 8/2017 | Deyle | |
| 2018/0001481 A1 | 1/2018 | Shah | |
| 2018/0221240 A1 | 8/2018 | Yu | |
| 2018/0240304 A1 | 8/2018 | Blatstein | |
| 2018/0268468 A1 | 9/2018 | Levy | |
| 2018/0284786 A1 | 10/2018 | Moshkina-Martinson | |
| 2018/0299899 A1 | 10/2018 | Suvarna | |
| 2018/0322268 A1 | 11/2018 | Grammer | |
| 2019/0005545 A1 | 1/2019 | Roh | |
| 2019/0033869 A1 | 1/2019 | Herron | |
| 2019/0033883 A1 | 1/2019 | Ferguson | |
| 2019/0049995 A1 | 2/2019 | Ferguson | |
| 2019/0061157 A1 * | 2/2019 | Suvarna | G05D 1/0274 |
| 2019/0099681 A1 | 4/2019 | Rico | |
| 2019/0102667 A1 * | 4/2019 | Bashkirov | G06V 10/764 |
| 2019/0129445 A1 | 5/2019 | Koo | |
| 2019/0180236 A1 | 6/2019 | Greenberger | |
| 2019/0208034 A1 | 7/2019 | Shribman | |
| 2019/0248002 A1 | 8/2019 | Deyle | |
| 2019/0248013 A1 | 8/2019 | Deyle | |
| 2019/0248014 A1 | 8/2019 | Deyle | |
| 2019/0248016 A1 | 8/2019 | Deyle | |
| 2019/0306230 A1 | 10/2019 | Purushothaman | |
| 2019/0360258 A1 | 11/2019 | Uemizo | |
| 2019/0375093 A1 | 12/2019 | Kim | |
| 2019/0375094 A1 | 12/2019 | Kim | |
| 2019/0375102 A1 | 12/2019 | Wang | |
| 2019/0377349 A1 | 12/2019 | Van Der Merwe | |
| 2019/0381671 A1 | 12/2019 | Yeo | |
| 2020/0020204 A1 | 1/2020 | Acres | |
| 2020/0023513 A1 | 1/2020 | Ha | |
| 2020/0037522 A1 | 2/2020 | Dejarnette | |
| 2020/0050206 A1 | 2/2020 | Deyle | |
| 2020/0156256 A1 | 5/2020 | Park | |
| 2020/0184278 A1 | 6/2020 | Zadeh | |
| 2020/0184542 A1 | 6/2020 | Welty | |
| 2020/0218254 A1 | 7/2020 | Sohn | |
| 2020/0283229 A1 | 9/2020 | Edwards | |
| 2020/0290210 A1 | 9/2020 | Ha | |
| 2020/0406470 A1 | 12/2020 | Herold | |
| 2021/0018912 A1 | 1/2021 | Dymesich | |
| 2021/0046650 A1 | 2/2021 | Deyle | |
| 2021/0081917 A1 | 3/2021 | Blackford | |
| 2021/0118001 A1 | 4/2021 | Bloy | |
| 2021/0154850 A1 * | 5/2021 | Sutherland | B25J 11/009 |
| 2021/0256472 A1 | 8/2021 | Ali | |
| 2021/0304052 A1 | 9/2021 | Pant | |
| 2021/0304556 A1 | 9/2021 | Cupersmith | |
| 2021/0331315 A1 | 10/2021 | Park | |
| 2021/0362335 A1 | 11/2021 | Kim | |
| 2022/0004979 A1 * | 1/2022 | Melanson | G07C 9/00896 |
| 2022/0017121 A1 | 1/2022 | Mclean | |
| 2022/0083058 A1 | 3/2022 | Passot | |
| 2023/0014881 A1 | 1/2023 | O'Hara | |
| 2023/0209127 A1 | 6/2023 | Sawyer | |

OTHER PUBLICATIONS

Office Action (Final Rejection) dated Apr. 20, 2022 for U.S. Appl. No. 17/212,780 (pp. 1-19).
Office Action (Notice of Allowance and Fees Due (PTOL-85)) dated Aug. 17, 2022 for U.S. Appl. No. 17/212,780 (pp. 1-9).
Office Action (Non-Final Rejection) dated Dec. 8, 2022 for U.S. Appl. No. 17/212,617 (pp. 1-26).
Office Action (Non-Final Rejection) dated Feb. 9, 2023 for U.S. Appl. No. 17/212,853 (pp. 1-13).
Office Action (Non-Final Rejection) dated Feb. 16, 2023 for U.S. Appl. No. 17/212,762 (pp. 1-10).
Office Action (Non-Final Rejection) dated Aug. 8, 2023 for U.S. Appl. No. 18/058,643 (pp. 1-38).
Office Action (Non-Final Rejection) dated Jun. 26, 2023 for U.S. Appl. No. 17/212,744 (pp. 1-5).
Office Action (Notice of Allowance and Fees Due (PTOL-85)) dated Jun. 1, 2023 for U.S. Appl. No. 17/212,853 (pp. 1-9).
Office Action (Final Rejection) dated Jun. 9, 2023 for U.S. Appl. No. 17/212,617 (pp. 1-31).

(56)                References Cited

OTHER PUBLICATIONS

HeB et al., Remote controlling of technical systems using mobile devices, 2009, IEEE, p. 625-628 (Year: 2009).

Chivarov et al., Multi-channel software infrastructure for remote control of service robots, 2019, IEEE, p. 12583-1288 (Year: 2019).

Bosch et al., Toward Evidence-Based Organizations: Lessons from Embedded Systems, Online Games, and the Internet of Things, 2017, IEEE, p. 60-66 (Year: 2017).

Amini et al., A Large-Scale Infrastructure for Serious Games Services, 2018, IEEE, p. 27-33 (Year: 2018).

Supriyanto et al., Gamification to Improve Digital Data Collection in Ecotourism Management, 2018, IEEE, p. 139-142 (Year: 2018).

Hu et al., A Mobile Game to Collect and Improve Position of Images, 2009, IEEE, p. 70-73 (Year: 2009).

Ward et al., Gaming network delays investigation and collection of very large-scale data sets, 2017, IEEE, p. 1-7 (Year: 2017).

Schatten et al., A Social Network Analysis of a Massively Multi-player On-Line Role Playing Game, 2015, IEEE, p. 37-42 (Year: 2015).

Office Action (Non-Final Rejection) dated Jun. 12, 2023 for U.S. Appl. No. 17/212,658 (pp. 1-21).

Office Action (Non-Final Rejection) dated Jun. 28, 2023 for U.S. Appl. No. 17/212,801 (pp. 1-10).

Notice of Allowance dated Jul. 5, 2023 for U.S. Appl. No. 17/212,762 (pp. 1-12).

Office Action (Notice of Allowance and Fees Due (PTOL-85)) dated Jul. 5, 2023 for U.S. Appl. No. 17/212,762 (pp. 1-11).

Office Action (Notice of Allowance and Fees Due (PTOL-85)) dated Sep. 22, 2023 for U.S. Appl. No. 17/212,744 (pp. 1-7).

Office Action (Non-Final Rejection) dated Sep. 21, 2023 for U.S. Appl. No. 17/212,902 (pp. 1-11).

Notice of Allowance dated Mar. 8, 2023 for U.S. Appl. No. 29/752,251 (pp. 1-7).

Notice of Allowance dated Aug. 23, 2023 for U.S. Appl. No. 29/752,251 (pp. 1-6).

Office Action (Notice of Allowance and Fees Due (PTOL-85)) dated Sep. 18, 2023 for U.S. Appl. No. 17/212,617 (pp. 1-8).

Office Action (Notice of Allowance and Fees Due (PTOL-85)) dated Sep. 28, 2023 for U.S. Appl. No. 17/212,658 (pp. 1-8).

Office Action (Notice of Allowance and Fees Due (PTOL-85)) dated Nov. 15, 2023 for U.S. Appl. No. 17/212,801 (pp. 1-5).

Office Action (Notice of Allowance and Fees Due (PTOL-85)) dated Nov. 9, 2023 for U.S. Appl. No. 17/212,658 (pp. 1-5).

Office Action (Notice of Allowance and Fees Due (PTOL-85)) dated Jan. 4, 2024 for U.S. Appl. No. 17/212,902 (pp. 1-8).

Office Action (Final Rejection) dated Feb. 2, 2024 for U.S. Appl. No. 18/058,643 (pp. 1-40).

Office Action (Notice of Allowance and Fees Due (PTOL-85)) dated Feb. 21, 2024 for U.S. Appl. No. 17/212,801 (pp. 1-6).

Office Action (Notice of Allowance and Fees Due (PTOL-85)) dated Mar. 6, 2024 for U.S. Appl. No. 17/212,902 (pp. 1-5).

Office Action (Non-Final Rejection) dated May 21, 2024 for U.S. Appl. No. 18/058,643 (pp. 1-30).

Office Action (Non-Final Rejection) dated Oct. 25, 2024 for U.S. Appl. No. 17/936,806 (pp. 1-13).

Office Action (Final Rejection) dated Nov. 6, 2024 for U.S. Appl. No. 18/058,643 (pp. 1-34).

Office Action (Final Rejection) dated May 16, 2025 for U.S. Appl. No. 18/503,633 (pp. 1-16).

* cited by examiner

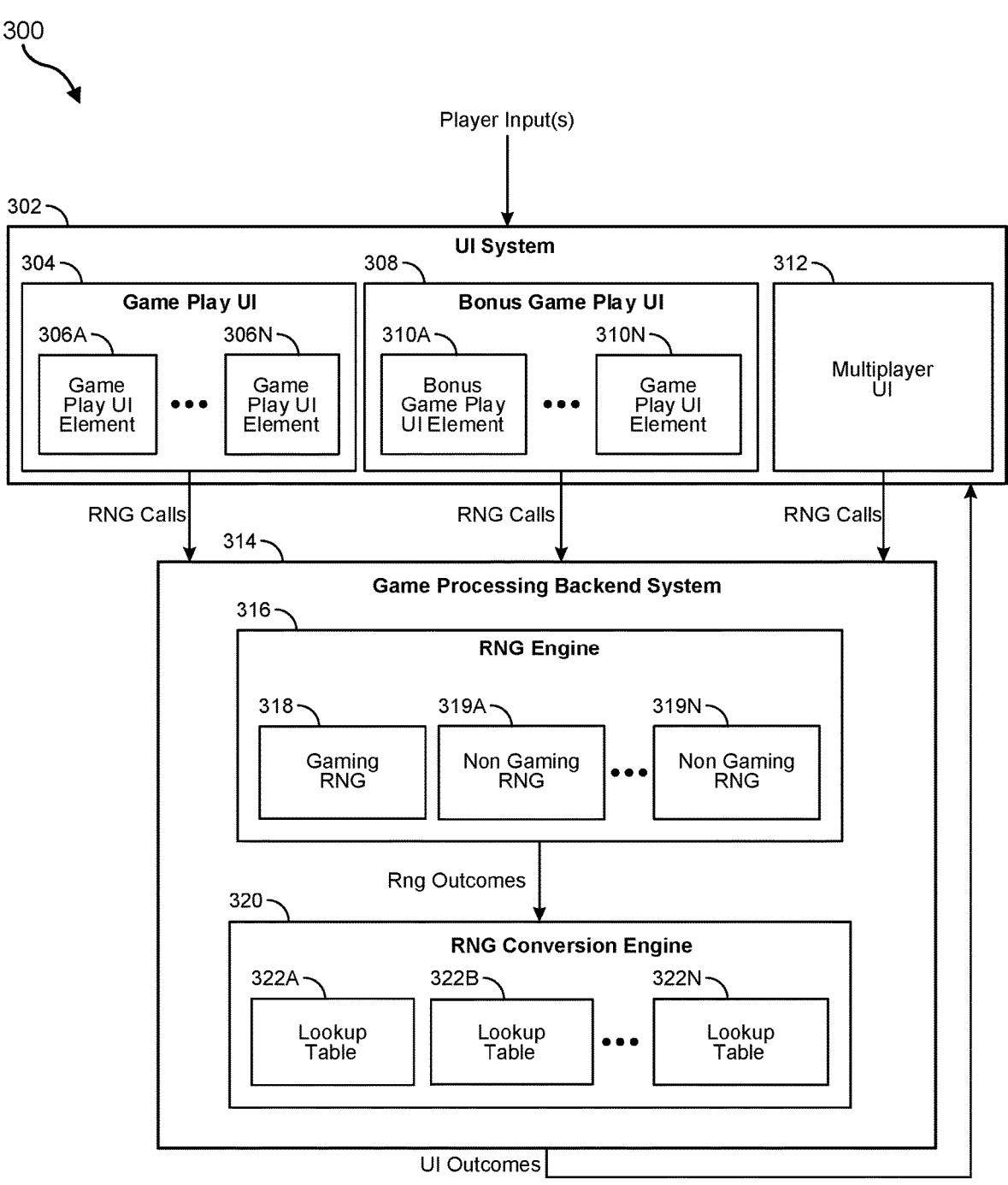

300

Player Input(s)

302

UI System

304

Game Play UI

306A

Game Play UI Element

306N

Game Play UI Element

• • •

308

Bonus Game Play UI

310A

Bonus Game Play UI Element

310N

Game Play UI Element

• • •

312

Multiplayer UI

RNG Calls

RNG Calls

RNG Calls

314

Game Processing Backend System

316

RNG Engine

318

Gaming RNG

319A

Non Gaming RNG

319N

Non Gaming RNG

• • •

Rng Outcomes

320

RNG Conversion Engine

322A

Lookup Table

322B

Lookup Table

322N

Lookup Table

• • •

UI Outcomes

*FIG. 3*

MODULAR ROBOT WITH POWER MANAGEMENT PLATFORM

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In some cases, robots have been introduced into gaming environments. Players of physical or electronic games in these environments, however, may experience wide ranges of emotion when winning or losing large sums of money or experiencing other highly emotional situations in an entertainment environment. Such players may also be eating or drinking or may be inclined to slip and fall. Accordingly, robots operating in such environments have to be continuously aware of their surroundings. This includes awareness of both fixed elements, such as gaming machines, as well as mobile entities, such as human players and their pets. Robots previously introduced into such environments have traditionally failed to successfully navigate and perform their designed functions in these constantly changing and unpredictable environments.

SUMMARY

As will be described in greater detail below, the present disclosure generally describes systems and apparatuses, including modular robots, that are designed to autonomously operate in different types of environments. Different arrays of sensors and power systems may be implemented to provide specified functionality in each disparate environment.

In one example, a system is provided that includes: a base subsystem that has a mobility device configured to move the base subsystem along a surface and a set of sensors physically coupled to the base subsystem and communicatively coupled to the mobility device in a manner than enables the system to navigate two or more different operational environments. The system further includes an upper subsystem that is coupled to the base subsystem and that includes a set of input devices and a control circuit programmed to coordinate input received from the set of input devices with signals from the set of sensors to provide a user with a gaming experience within a specific operational environment of the two or more different operational environments.

In some embodiments, the set of input devices on the upper subsystem may include a second set of sensors, one or more display devices, one or more touchscreen devices, or one or more physical buttons. In some examples, the second set of sensors includes at least one sensor that is different from the set of sensors in the base subsystem. In some cases, the system further includes a second, different upper subsystem that includes a third, different set of sensors, where the third, different set of sensors includes at least one sensor that is different from both the sensors in the set of sensors and in the second set of sensors.

In some examples, the base subsystem further includes a battery and a charge controller that is configured to regulate charging and discharging of the battery. In some cases, the battery in the base subsystem is configured to power the set of input devices of the upper subsystem. In some embodiments, the upper subsystem includes one or more customized power regulation circuits that receive and distribute power from the battery in the base subsystem.

In some cases, the one or more customized power regulation circuits are configured to provide power to a subset of the set of input devices that have voltage and ampere requirements that lie within specified ranges. In some examples, the one or more customized power regulation circuits that provide power to the subset of input devices having specific voltage and ampere requirements include current-limiting fuses. In some embodiments, the control circuit is configured to at least partially regulate power to the subset of input devices. Still further, in some examples, the upper subsystem is grounded to the base subsystem to avoid electrical short connections between conductors of grounded circuits in the upper subsystem.

In some cases, a corresponding apparatus may be provided. The apparatus may include a base subsystem that includes a mobility device configured to move the base subsystem along a surface and a set of sensors physically coupled to the base subsystem and communicatively coupled to the mobility device in a manner than enables the system to navigate two or more different operational environments. The apparatus further includes an upper subsystem that is coupled to the base subsystem and that comprises a set of input devices and a control circuit programmed to coordinate input received from the set of input devices with signals from the set of sensors to provide a user with a gaming experience within a specific operational environment of the two or more different operational environments.

In some embodiments, the set of sensors in the base subsystem includes a plurality of edge detecting sensors mounted on one or more peripheral surfaces of the base subsystem. In some examples, the edge detection sensors are configured to detect physical edges to update the boundaries of virtual fences within the two or more different operational environments. In some embodiments, software can be configured by an administrative user to establish virtual fences which produce invisible boundaries the module robots are not to autonomously navigate past. In some cases, the boundaries of the virtual fences change over time. In some cases, the boundaries of the virtual fences change according to a specified schedule.

In some examples, the two or more different operational environments include a casino lobby, a casino floor, a hotel lobby, a storefront, a restaurant, a bingo hall, a movie theater, a bowling alley, or a hotel guest room. In some embodiments, the gaming experience includes providing communication with an external entity, providing a food or beverage to the user, or providing other items to the user. In some cases, providing a food or beverage to the user includes providing an adult beverage that is locked in an electronically unlockable container that is part of the upper subsystem. In such cases, the electronically unlockable container may be unlockable solely by a designated user or administrative user.

In some embodiments, a modular robot may be provided. The modular robot may include a base subsystem that has a mobility device configured to move the base subsystem along a surface and a set of sensors physically coupled to the base subsystem and communicatively coupled to the mobility device in a manner than enables the system to navigate two or more different operational environments. The modular robot may also include an upper subsystem that is coupled to the base subsystem and that includes a set of input devices. Still further, the modular robot may include a control circuit programmed to coordinate input received from the set of input devices with signals from the set of sensors to provide a user with a gaming experience within a specific operational environment of the two or more different operational environments.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

FIG. 3 illustrates, in block diagram form, an implementation of a game processing architecture algorithm that implements a game processing pipeline for the play of a game in accordance with various implementations described herein.

DETAILED DESCRIPTION

This disclosure generally describes a modular robot that is designed to operate in a variety of different environments. These environments may include casino floors, restaurants, hotel lobbies, guest accommodations, or other similar locations. As noted above, previous attempts have been made to introduce robots into gaming environments. These efforts have typically failed to successfully navigate and perform their designed functions in environments that are unpredictable and are constantly changing. For instance, players of physical or electronic games in these environments may experience wide ranges of emotion when winning or losing at a game. These players may be overly tired or even intoxicated, leading to unpredictable and potentially unsafe behavior. Or, players may be coming in wet from a swimming pool or may be overly tired or even intoxicated, leading to unpredictable and potentially unsafe behavior. As such, robots operating in these environments have traditionally been unable to watch for and react to these sudden changes in behavior and have further failed to navigate these hazards while still performing their intended functions.

The modular robots described herein may include multiple different sensors to safely and efficiently operate in such environments. In some cases, the modular robots may include different sensors or sensor arrays in each of their modular sections to ensure that the robots are continuously aware of their surroundings. These modular sections may be suited for operation in specific environments. As such, each modular section may include different arrays of sensors that are designed for operation in each particular environment. The sensors may be configured to provide sensor input that allows the modular robot to move and perform specialized functions in each of the different environments. Still further, each set of sensors may be controlled by a control circuit that is configured to coordinate different types of sensor signals with inputs received via input devices (e.g., touchscreens) that may be part of the modular robot. In this manner, the modular robot can provide users with a gaming experience in a specific operational environment using sets of sensors that are specific to that environment.

Figure 1:
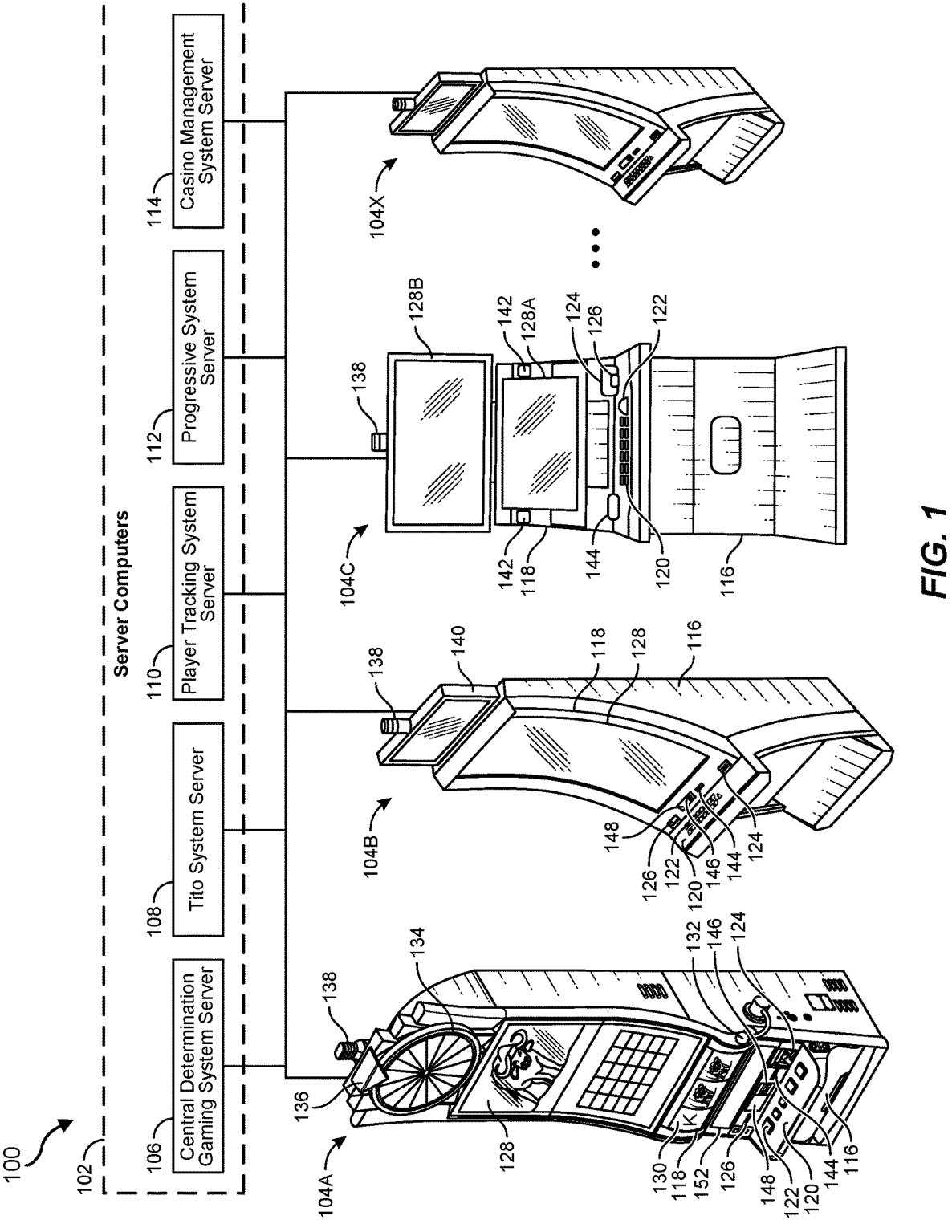
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels

130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
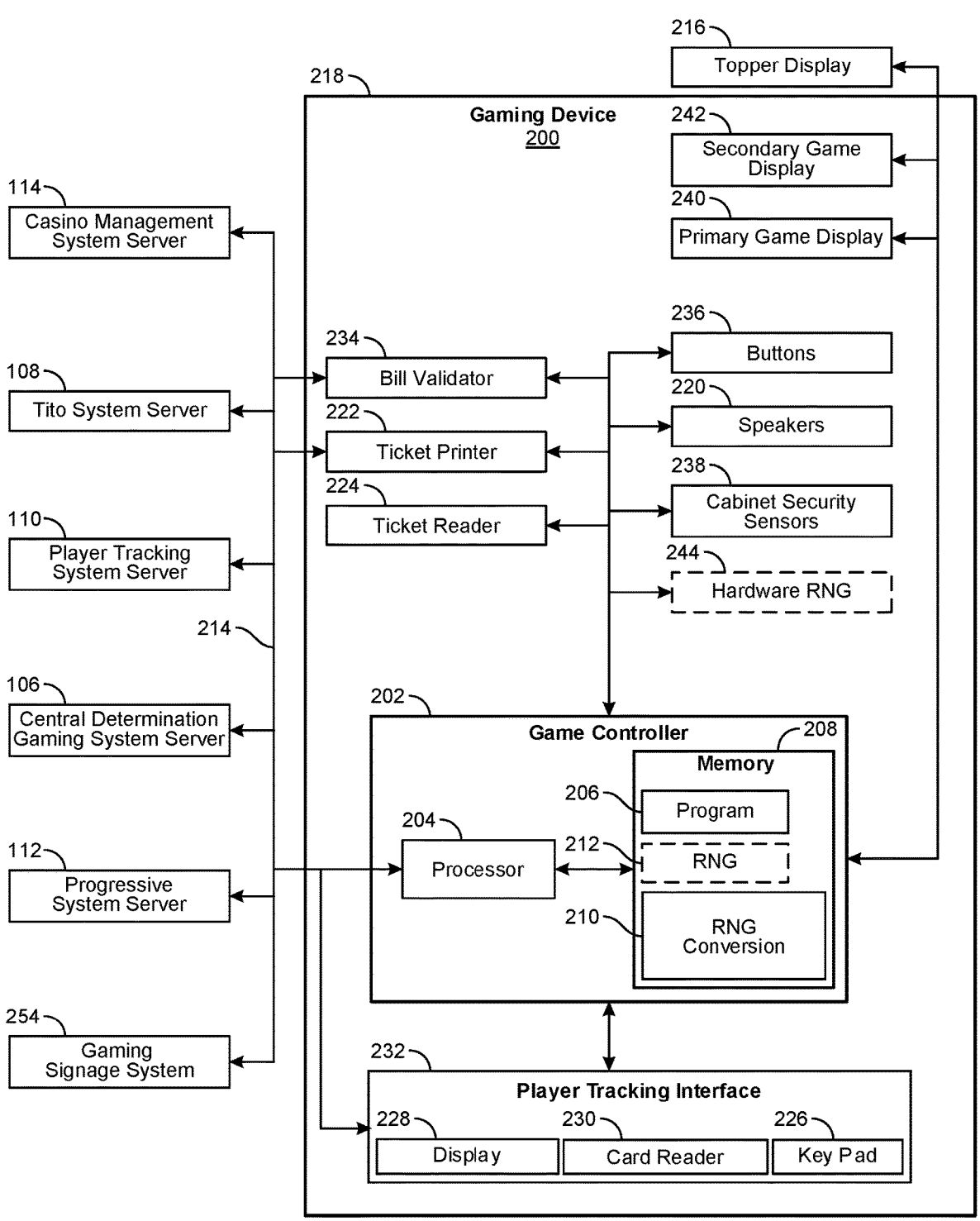
FIG. 2A is a block diagram showing various functional elements of an exemplary EGM.

Many or all the above-described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random-access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
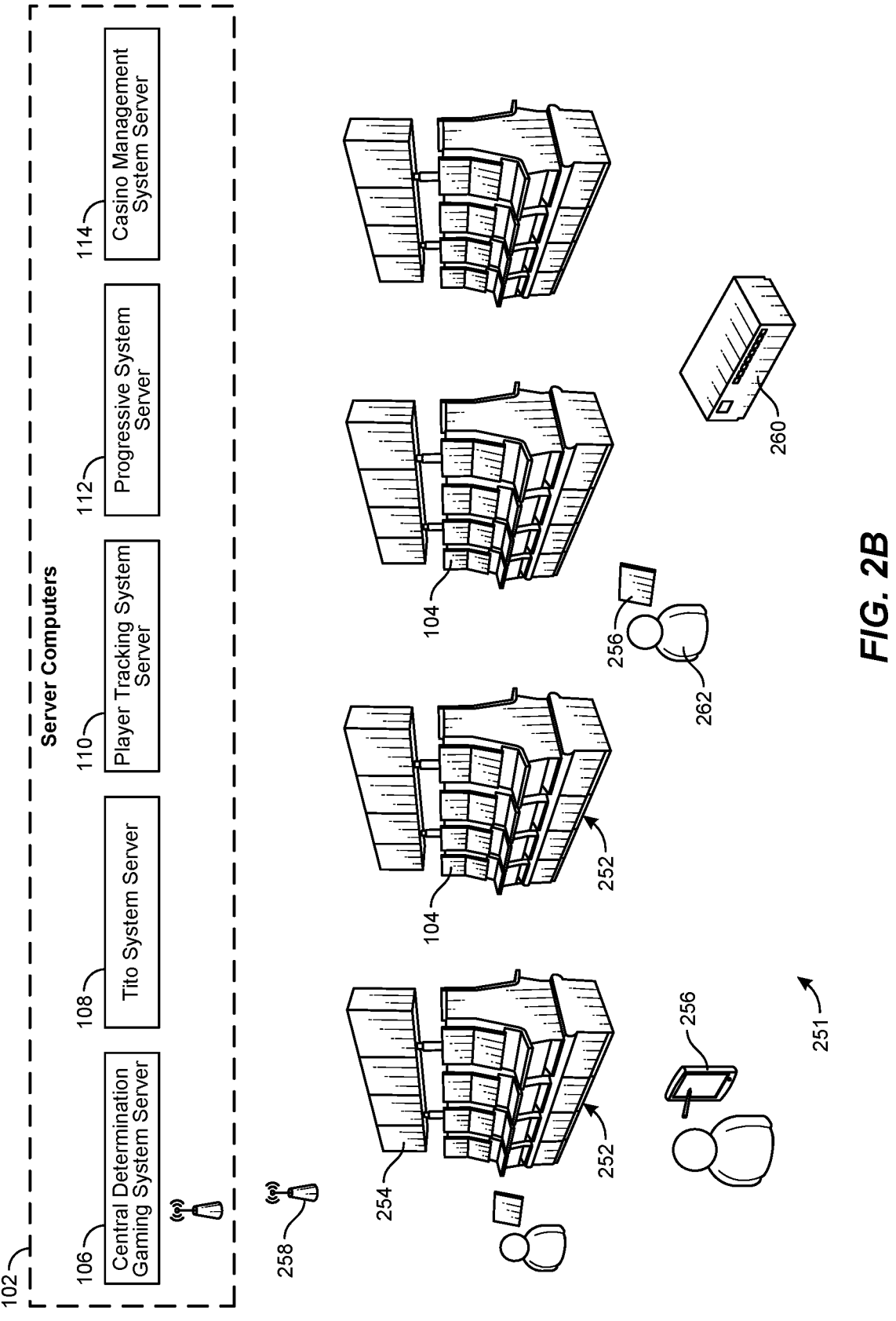
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
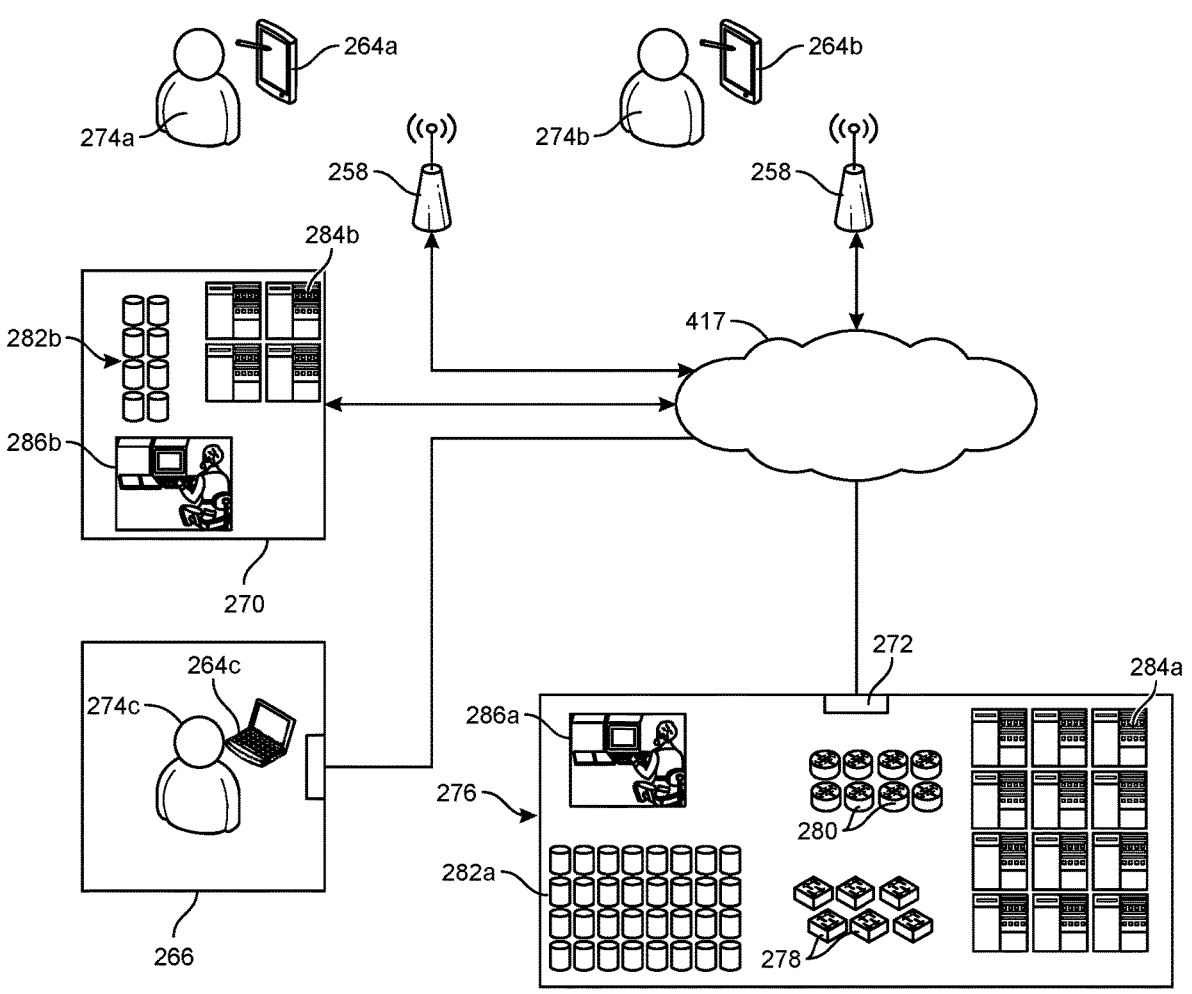
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 270a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server (s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4B:
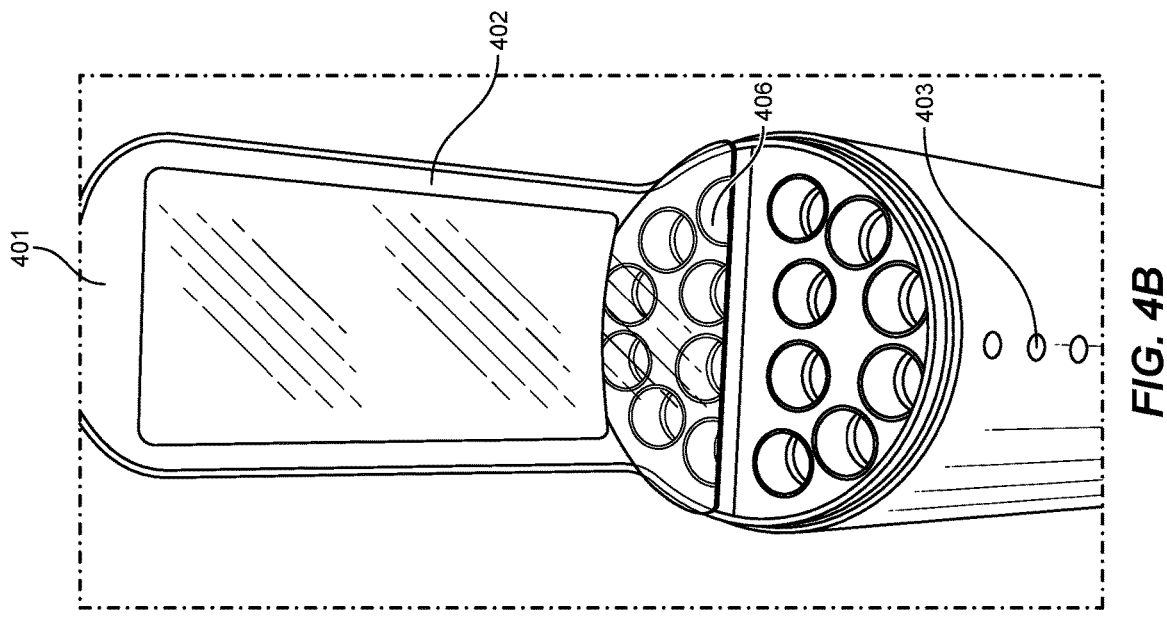
FIG. 4B illustrates an alternative embodiment of a modular robot in operation in a gaming environment.
Figure 4A:
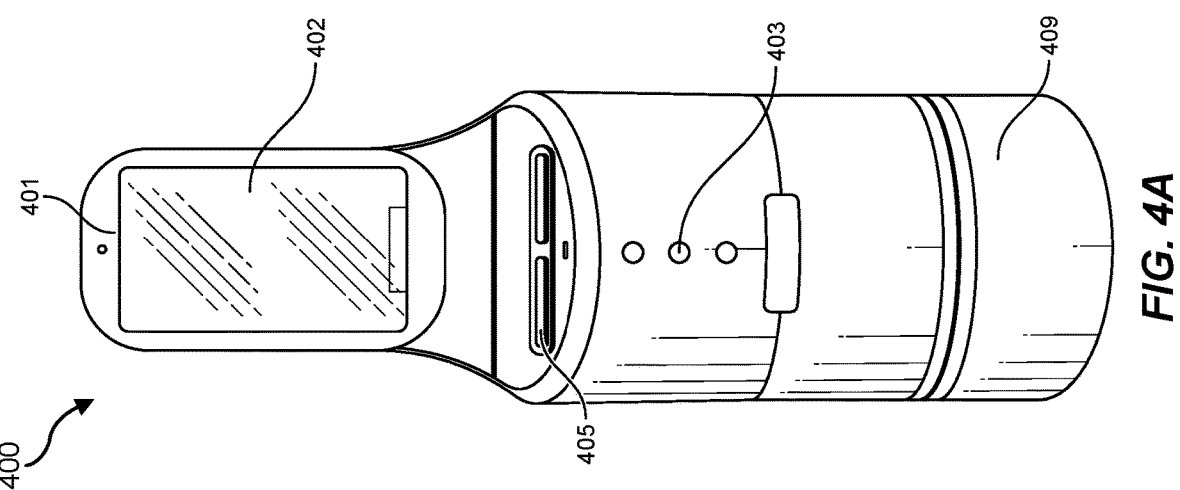
FIG. 4A illustrates an embodiment of a modular robot in operation in a gaming environment.

Turning now to FIG. 4A, a system 400 may be provided that includes multiple different electronic and mechanical components. In some cases, the system may be a modular robot that includes a base portion 409 with multiple different modular top portions 401. These different top portions may include components that are particularly suited to specific operating environments. Moreover, each modular top portion may include a different set of sensors that operate together to perform certain functions within specific environments. The modular top portion 401 may include, for example, a touchscreen 402 that allows users to perform gaming-related functions in a gaming environment, including ordering drinks, accessing physical or electronic games, exchanging money for chips, checking in to a hotel, or performing other functions. The gaming environment may include any of the gaming devices 104A-104X described in FIG. 1 above. Moreover, the gaming environment may include multiple gaming devices 200 of FIG. 2A and/or banks of EGMs 252 of FIG. 2B. In some cases, the modular robot may be designed to operate among these devices and navigate its way through these devices while safely providing their intended functions.

In some cases, the modular top portion 401 may include buttons 405 or other interactive elements that allow a user to interact with the robot. The modular top portion 401 may also include different sensors 403 that assist the robot in navigating through different operational environments. These sensors 403 will be further defined with regard to FIG. 7, but may include depth-sensing cameras, near-infrared edge detectors, sonar sensors, lidar sensors, inertial motion units (IMUs), or other types of sensors. Each of the modular top portions may be electronically and communicatively connected to the base portion 409, which may include wheels, tracks, or other motive elements that are driven by a motor and powered by a battery (or multiples of the same). As shown in FIG. 4B, the modular robot may include a different top portion 401 that includes drink holders 406 instead of interactive buttons. The drink holders 406 may carry drinks that are to be served to gaming participants in a casino, for instance. Other types of modular top portions may also be used. These embodiments, and others that include different types of modular top portions, will be described further below with regard to FIGS. 5A-10B.

Figure 5A:
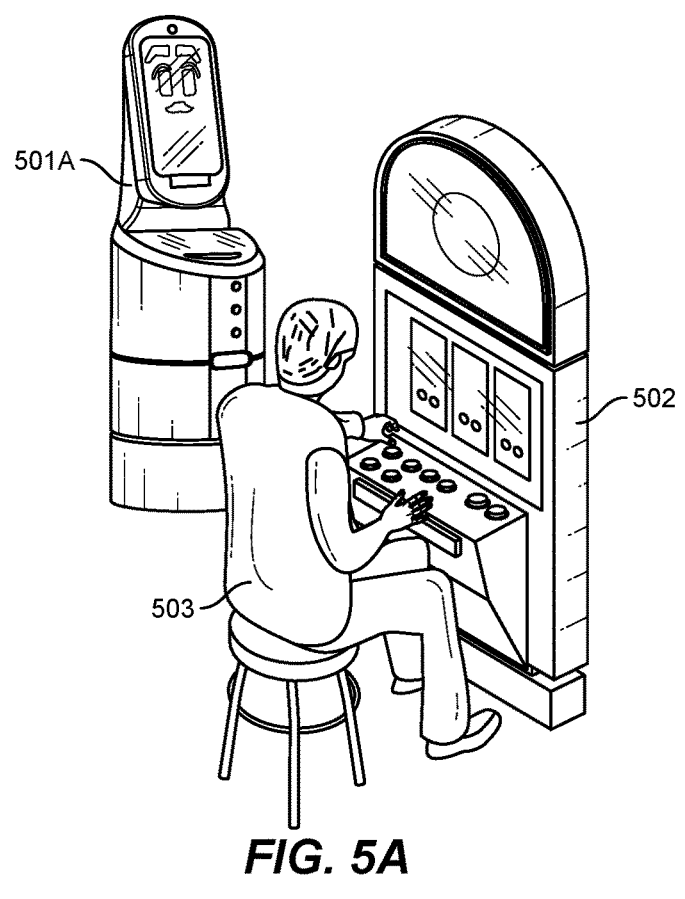
FIGS. 5A and 5B illustrate embodiments of a modular robot in operation in different gaming environments.

FIG. 5A illustrates one example environment in which the modular robots described herein may operate. In FIG. 5A, a user 503 may be playing an electronic game of chance 502 on a casino floor. While the user 503 is playing the game of chance 502, the modular robot 501A may be directed or controlled to move to the user's vicinity. The modular robot 501A may use multiple different combinations of sensors to guide itself through the casino environment toward the user. The modular robot 501A may then provide hospitality-related functions, for instance, including providing food or beverages to users, providing hotel check-in functions, providing taxi hailing functions, providing airline check-in functions, providing the ability to purchase tickets to a nighttime show, or providing other functions. The modular robot 501A may then provide hospitality-related functions, for example, including providing food or beverages to users, providing hotel check-in functions, providing taxi hailing functions, providing airline check-in functions, providing the ability to purchase tickets to a nighttime show, or providing other functions. As will be explained below, each of these functions may implement different combinations of sensors and/or different modular top portions on the modular robot 501A.

Figure 5B:
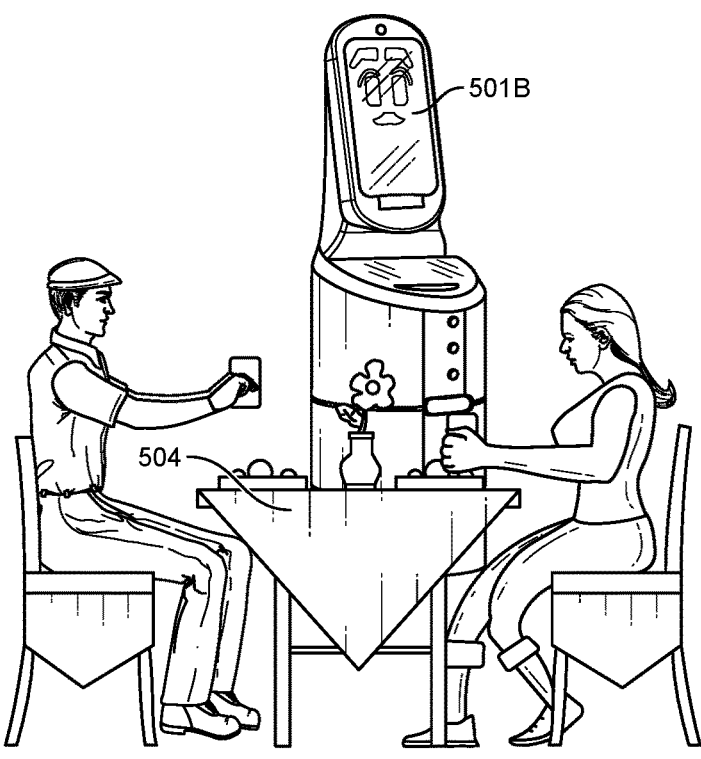

FIG. 5B illustrates a dining environment in which the same or a different modular robot 501B may be used. The modular robot 501B may allow users to order food or drinks and may also deliver food or drinks to the users 504 within the dining environment. Like the modular robot 501A in the casino environment, the modular robot 501B may include different combinations of sensors or other electrical or mechanical components in order to perform its designated functions. The sensor inputs received from these specific combinations of sensors may be used, in combination with inputs received from users via touchscreens or other input devices, to perform specific functions in highly variable environments. Examples of such sensors and electronic/mechanical components are shown in FIG. 6.

Figure 6:
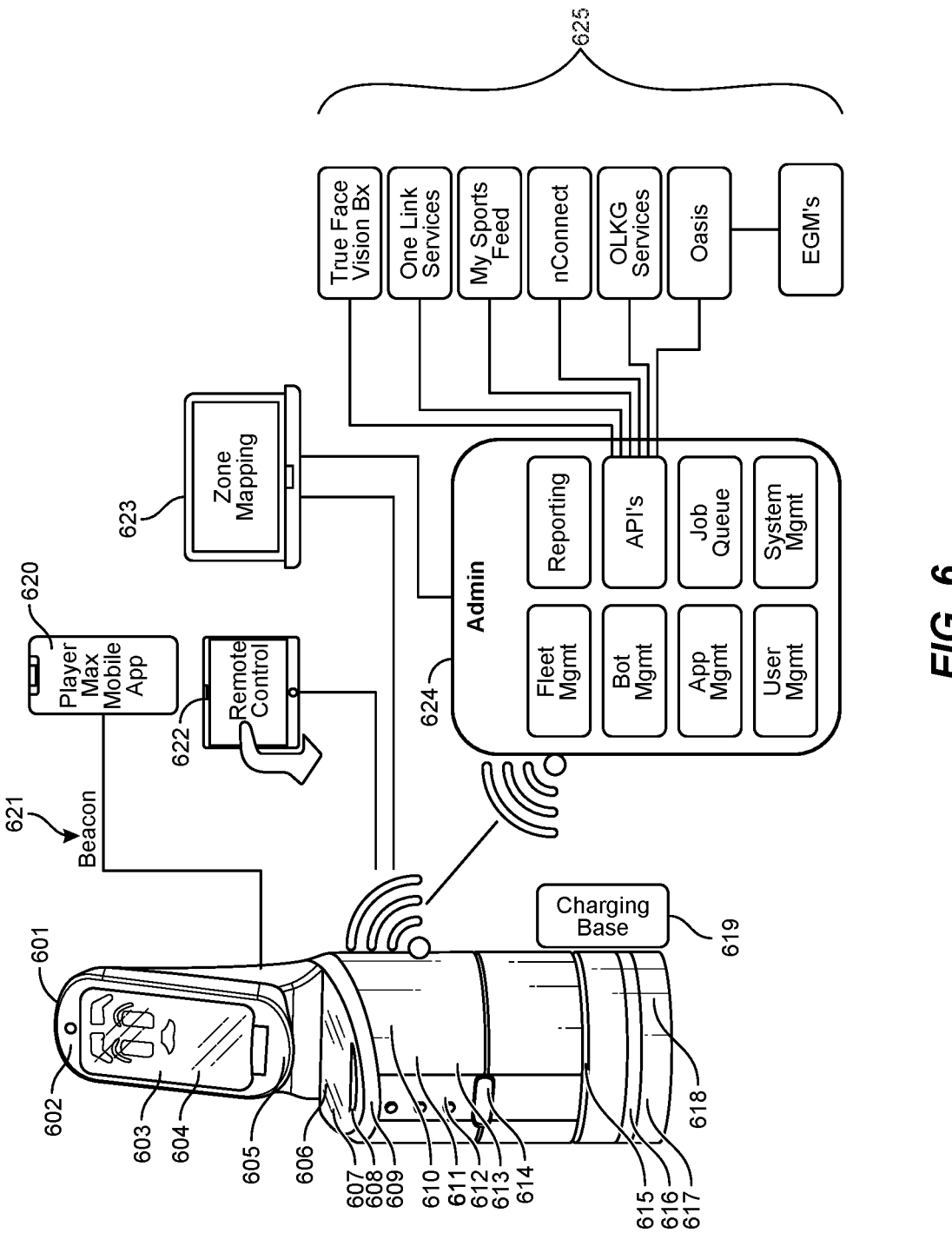
FIG. 6 illustrates an embodiment of a modular robot, including indications of different components that may be implemented therewith.

FIG. 6 illustrates an example modular robot 601 that includes a base subsystem 615. The base subsystem 615 may include a mobility device 616 that is configured to move the base subsystem 615 along a surface such as a casino floor. The mobility device 616 may include wheels, tracks, rollers, or driven elements that move the modular robot 601 along a surface. In some cases, the surface is a floor such as the floor of a restaurant or the floor of a hotel or casino. In some embodiments, the mobility device 616 is configured to provide lateral motion, while in other cases, the mobility device may provide both lateral and vertical motion (such as ascending up ramps, stairs, or over bumps or obstacles).

In some cases, the base subsystem 615 may include a set of sensors 617 that are physically coupled to the base subsystem 615 and are communicatively coupled to the mobility device in a manner than enables the system to navigate two or more different operational environments. The sensors 617 may include lidar, sonar, depth sensing cameras, bumper limit switches, edge detectors (e.g., near infrared (NIR) sensors), or other similar sensors. These sensors may operate alone or in tandem to provide sensor data that is interpreted by a controller 618 and is used by the controller, and packaged using custom software, to propel the mobility device 616 in a specific direction. The custom software may construct instructions, for movement of the system, sent over RS-485 protocol, or a similar communication protocol, to the mobility device. The software may package commands in hexadecimal for initialization and basic movement instructions, such as, forward, backward, velocity, acceleration, and deacceleration. These instructions interpreted by the mobility device may contain packet verification, like including cyclic redundancy checks (CRCs). In some embodiments, the sensors may include inertial motion units (IMUs), global positioning systems (GPSs), speed sensors, gyroscopes, or other location-sensing systems used for performing simultaneous location and mapping (SLAM). These sensors work in tandem with edge detecting sensors to precisely navigate the system along a casino floor, within a restaurant, within a hotel, along a storefront, or in other environments (e.g., by a swimming pool or outdoor lounge). The base subsystem 615 may also include a base charging unit 619 that allows the system to charge its battery when not in use.

The base subsystem 615 may support multiple different modular upper subsystems. In FIG. 6, for example, an upper subsystem 610 may be connected to the base subsystem 615. The upper subsystem 610 may be physically and communicatively coupled to the base subsystem 615 and may include a set of input devices 602 and/or 609. The input device 602 may be a touchscreen 603 that may include multiple different touch-sensing portions 604 or 605 that allow users to interact with the upper subsystem 610. The input device 609 may include different digital input buttons 606 or 607, along with one or more physical buttons 608, that allow users to interact with the upper subsystem 610. These interactions may include ordering food or beverages, providing proof of identity, reserving or checking in for a hotel room, or performing other functions. Different upper subsystems may provide different input devices to allow the user to perform specific functions. The input devices may also include sensors that are variably placed within the upper subsystem 610. For instance, the input devices may include lidar sensors 612, sonar sensors 613, depth-sensing cameras 614, or other sensors.

Still further, the upper subsystem 610 may include a control circuit 611 that is programmed to coordinate input received from the set of input devices 602, 609, and/or

612-614 with signals from the sensors in the base subsystem 615 to provide a user with a gaming experience within a specific operational environment of the different operational environments. The control circuit 611 may receive inputs from depth-sensing cameras, for example, to determine the location of a user relative to the robot. Images from these depth-sensing cameras may be analyzed and interpreted to identify (in real time or substantially in real time) the pose of these users and whether the users are making gestures that are to be interpreted as inputs. Alternatively, the user may provide inputs via a touchscreen or via a fingerprint reader. Or, the user may use their smartphone or other electronic device to scan a QR code displayed on the upper subsystem 610 and then interact with the robot through their smartphone. Other sensor input data may be used to determine the robot's global location and/or location relative to other gaming devices, people, obstacles, or other items. Users may provide inputs that order a drink and instruct the robot to navigate to a bartender, retrieve the drink, and return to the user autonomously. In such cases, the control circuit 611 may continuously interpret sensor data, in combination with the instructions received from the user, to navigate the robot through the changing environment and perform the intended function of retrieving the drink.

In some embodiments, the base subsystem 615 may include a specified set of sensors for navigation. This set of sensors may include a GPS sensor, or an IMU sensor, or GPS and IMU sensors for calculating robot odometry. In other cases, the base subsystem may include edge detecting sensors (e.g., lidar or NIR sensors). Or, still in other cases, the base subsystem 615 may include edge detecting sensors and navigation sensors. The upper subsystem 610 may include different sets of sensors based on which type of functionality is to be provided. In some cases, the upper subsystem 610 may be used for delivering items from a hotel lobby to a guest room. In such cases, the upper subsystem 610 may include GPS or IMU sensors only. In cases where the upper subsystem 610 is used on a casino floor, the set of sensors may include additional sensors to detect the robot's surroundings including people, electronic gaming machines, and other potential obstacles. In such cases, the upper subsystem 610 may have depth-sensing cameras, sonar arrays, lidar, image sensors, or other sensors. In cases where the upper subsystem 610 is to be used in a dining room or to serve drinks, the upper subsystem 610 may include gyroscopes, IMUs, or other sensors used for stabilization to carry the food and drinks without spilling. Other functions and other sensor combinations are also possible; indeed, the above examples are meant for illustration only and are not intended to be limiting.

Figure 7:
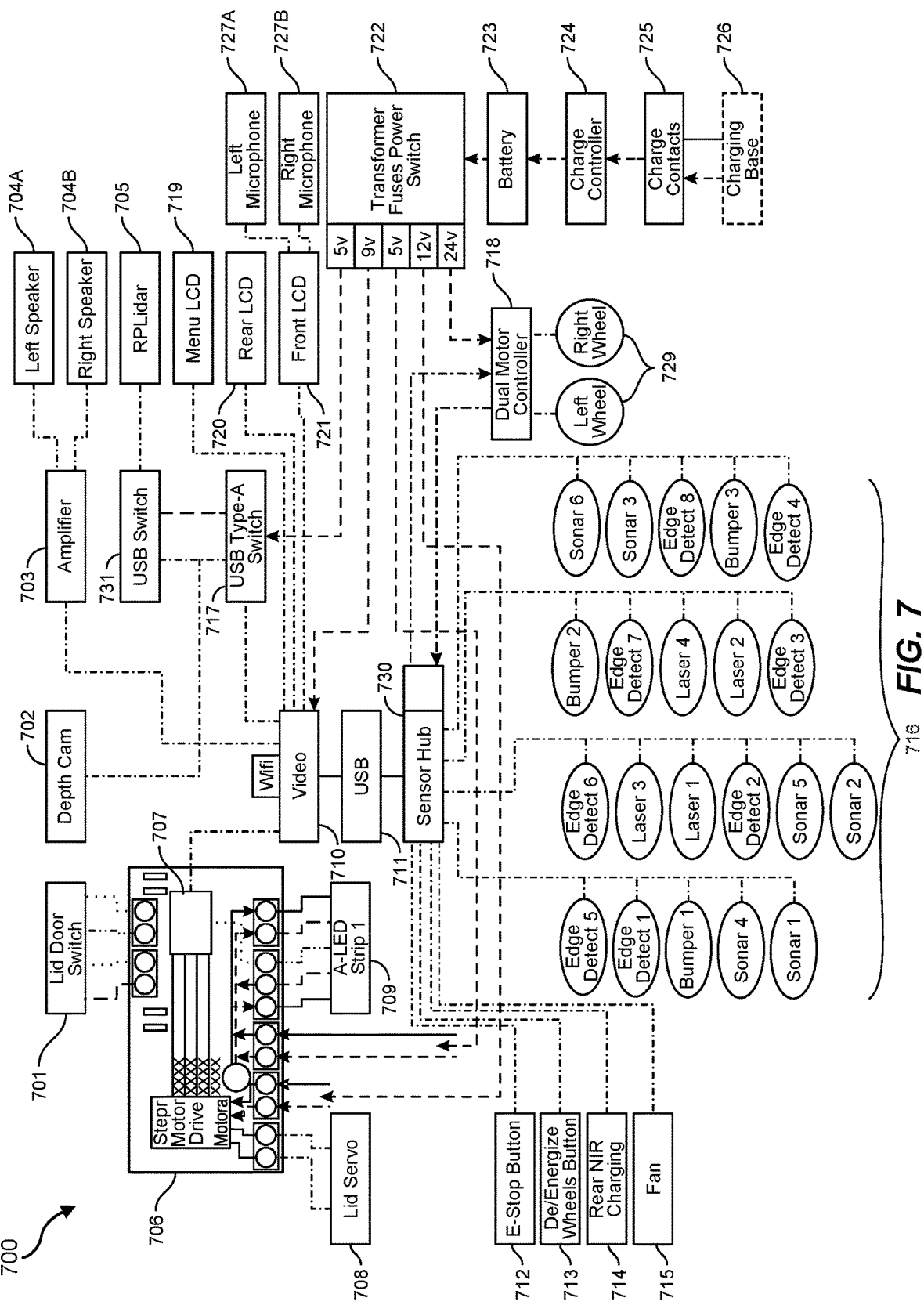
FIG. 7 illustrates a schematic diagram of a sensor hub that may be used in conjunction with the modular robots described herein.

Further examples of sensors that may be used in such embodiments are shown in FIG. 7. FIG. 7 illustrates a component diagram 700 that includes at least some of the sensors that may be used with the modular robots and other systems described herein. The component diagram 700 includes a control circuit 707 that may be the same as or different than the control circuit 611 of FIG. 6. The control circuit 707 may be designed and/or programmed to receive sensor inputs from the base subsystem and from other input devices, along with control signals from various input devices and then provide the user with some type of gaming experience. The term gaming experience, as mentioned above, may refer to any of the games of chance described above in relation to FIGS. 1-3, whether in physical form or electronic form. The gaming experience may also extend to the provisioning of food, gaming chips, beverages, secure storage for valuable items, transport of personal items to or from a hotel room, ordering of food or event tickets, setting up reservations for hotels or airfare, or other experiences that may be provided in a casino or in a gaming environment.

The control circuit 707 may include various switches and electronic components for providing a gaming experience to a user. For instance, in cases where the modular top portion of the system includes a food or beverage serving compartment with a lid and/or a QR code scanner or radio frequency identifier (RFID) scanner to verify the user's identity, a lid servo motor 708 may be implemented, along with a lid door switch 701, to automatically open a food/beverage serving dish lid. In cases where the beverage is an adult drink, the lid door may be configured to remain closed and/or locked until an intended user provides proof of identity using an input device such as a touchscreen, QR code reader and smartphone, identification card, or other input device. In this manner, the electronically unlockable container may be unlockable solely by the intended user upon verification of their identity. LEDs (e.g., 709) may be implemented to highlight where to interact with or where to unlock and access the food or (adult) beverages within the modular robot. The control circuit 707 may also receive signals from various sensors through a sensor hub 730. The sensor hub 730 may be electrically and communicatively connected to different types of sensors including sensors 716 (e.g., arrays of edge detectors, bumper switches, sonar arrays, laser (e.g., lidar) sensors, or other types of sensors. The sensor hub 711 may also be connected to an emergency stop button 712, to a de/energize button 713, to a rear NIR charging component 714, and/or to a cooling fan 715.

Still further, the control circuit 707 may be communicatively connected to a power distribution unit 706 that may include a transformer power switch 722, a battery 723, a charge controller 724, electrical charging contacts 725, and a charging base 726 configured to charge the battery (or multiple batteries) of the robot. The control circuit 707 may at least partially regulate the manner in which power is distributed to a subset of the aforementioned input devices. The power distribution unit 706 may provide power to a dual motor controller 718 that provides power to the wheels 729. The power distribution unit 706 may also provide power to a video subsystem 710 that includes an amplifier 703, left and right speakers 704A/704B, a depth camera 702, a universal serial bus (USB) subsystem 731 that electrically connects one or more lidar sensors 705 and a USB switch 717, and various liquid crystal display (LCD) monitors 719, 720, 721 (or other types of monitors) and left and right microphones 727A/727B. In some cases, the power distribution unit may provide different levels of power to different sets of components (e.g., at 5V, 9V, 12V, 24V, etc.). Each of these power levels may be properly fused to limit the flow of electricity beyond a specified upper limit.

Returning to FIG. 6, the modular robot 601 may be controlled through an administrative software application 624. The administrative software application 624 may include different software modules, including a fleet management module (e.g., for managing a fleet of modular robots), a reporting module (e.g., for generating reports related to robot functionality), an application programming interface (API) for programming the robot, a robot management module for controlling robot functions, an application management module for modifying applications running on the robot, a job queue for adding or modifying the robot's assigned jobs, a user management module for controlling which users can access which functions (e.g., functions specific to each modular top portion), and a system management module that allows administrators to manage the robot's various functions and operating systems.

The modular robot 601 may also include a corresponding mobile application 620 that communicates with the robot via a beacon 621. Additionally or alternatively, an administrator may communicate with the modular robot 601 via a remote control 622. For instance, in some cases, an administrator may establish a virtual fence within a casino floor. The virtual fence may provide changeable boundaries for the robot that specify physical locations within which the robots may operate (and beyond which the robot may not operate). The changeable boundaries may fall along physical boundaries (such as along walls, along transitions between rooms, or along rows of EGMs), or may be arbitrarily set and may not follow physical boundaries.

The administrator may use the remote control (and one or more of the aforementioned administrative modules) to establish zone mappings 623 for each robot or set of robots. These zone mappings 623 may specify locations within which the robots may operate. In some cases, the zone mappings are specific to each robot, and may change over time. For instance, the zone mappings 623 may apply at various times of day, or on different days of the week, during special events (e.g., nighttime shows), or at other times as designated by the administrator. Virtual boundaries may change automatically according to a specified schedule. If, at a time change, a robot is in a zone that is no longer an approved zone, the robot may use its navigation system to navigate itself back into a proper zone. In some cases, the changeable zone mappings may overrule any physical boundaries, allowing the robot to traverse the physical boundary and remain within the changeable zone mapping. Alternatively, the changeable zone mappings 623 may be overruled by physical boundaries detected by edge detecting sensor input and may thus limit the robot to areas within one or more physical boundaries, even though the zone mapping would allow further travel. Links to other external systems 625 may also be provided for the modular robot in order to manage the robot at different levels of granularity.

In some embodiments, the upper subsystem of the modular robot may include different devices in its set of input devices, including one or more of the sensors shown in FIG. 7. For instance, the upper subsystem may include multiple different sets of sensors, depending on which functions the upper subsystem is to perform. The upper subsystem may include display devices (e.g., television monitors or LCD displays), touchscreen devices (e.g., tablets or other touch-sensitive screens), physical buttons that indicate user inputs, QR code readers that allow users to interact with the robot wirelessly using their phone or other electronic device, or other input devices.

In some cases, the sensors may include different arrays or suites of sensors. In some embodiments, for instance, one set of sensors in the upper subsystem may include at least one sensor that is different from the set of sensors in the base subsystem. Each set of sensors may be particular to the functions being performed by the upper subsystem. The base subsystem, for example, may include lidar and sonar sensors for navigating through various environments. The upper subsystem may include depth cameras, video cameras to identify objects around the robot, lidar sensors, capacitive touch sensors to receive user inputs, ambient light sensors or humidity sensors to detect changes in indoor/outdoor environments, or other different sensors. Additionally, or alternatively, other upper subsystems may include sensors that are different than the previously mentioned upper subsystem. Still further, these sensors may be different from both the sensors in the base subsystem and in the modular upper subsystems. Thus, as can be seen, different sets of sensors may be used for each base or upper modular portion of a robot in order to perform the functions for which each modular portion is designed.

Figure 8:
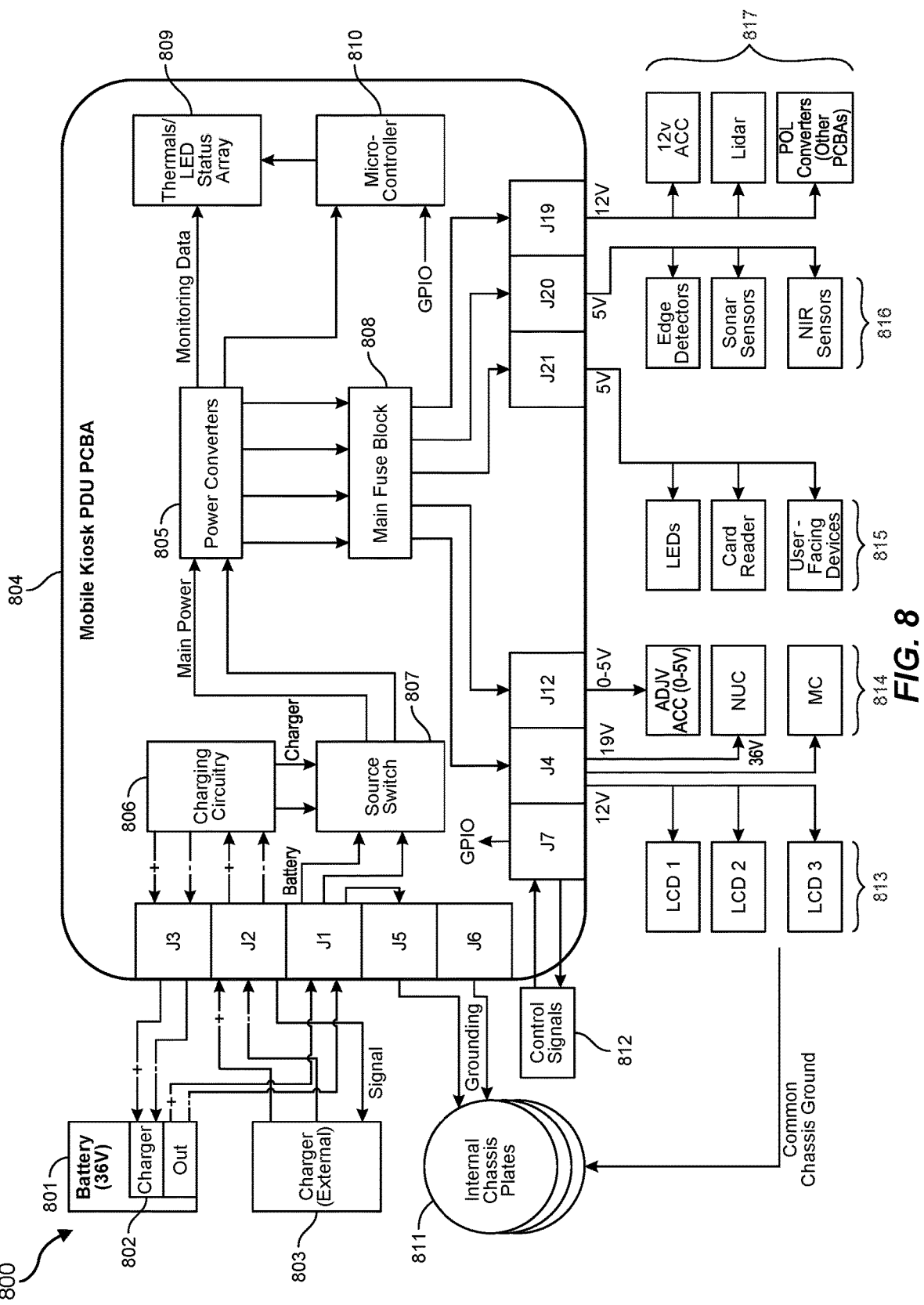
FIG. 8 illustrates a schematic diagram of a power distribution unit that may be used in conjunction with the modular robots described herein.

FIG. 8 illustrates a component diagram 800 for a power distribution unit 804 for a mobile robot (e.g., a modular mobile kiosk). The component diagram 800 includes a plurality of different components for controlling power to the above-described sensors and other input devices. The power distribution unit 804 may include electrical and electronic components that are used when managing power flow to the various components. For instance, the power distribution unit 804 may include one or more batteries 801 and associated chargers 802 and 803. The power distribution unit 804 may also include power converters 805, along with charging circuitry 806 (e.g., a charge controller) and switches 807 to switch between batteries or to convert power from AC to DC.

A main fuse block 808 may be implemented to protect the various subsystems and circuits implemented in the modular robot. Such circuits may include LCD screens 813 operating at 12 volts, independent computer systems 814 or motor controllers operating at 19V or 36V, respectively, LEDs, card readers, or other user-facing devices 815 operating at 5V, edge detectors 816, sonar sensors, lidar sensors 817, NIR sensors, or other sensors operating at 5V, lidar, power converters, or other components operating at 12V, etc. Each of these subsystems or groups of electronic components may be fused with one or more current-limiting fuses in the main fuse block 808.

Moreover, power to each component or group of components may be controlled via a microcontroller 810. This microcontroller 810 may also monitor the thermal status 809 of one or more of these components via control signals 812. In some cases, the power distribution unit 804 and/or the individual components may be grounded to internal chassis plates 811 or to another common ground. Each of the electrical connections may be securely fastened with screws, clips, or other components that are robust against vibrations or repetitive movements to avoid short connections between conductors and keep components properly grounded. Moreover, different upper modular portions of the robot may have different power needs for each sensor array. In such cases, the power distribution unit 804 may be modified to include power converters, fuses, microcontrollers, batteries, or other components that are specific to the modular upper portion.

Likewise, the base subsystem may have its own batteries, charge controllers, fuses, power converters, or other components that regulate charging and discharging of the subsystem's battery. In some embodiments, the battery in the base subsystem may be configured to power the set of input devices (e.g., sensors, touchscreens, QR code readers, etc.) of the upper subsystem. In some cases, the base subsystem and/or the upper subsystem may include customized power regulation circuits (e.g., power distribution unit 804) that are configured to distribute power from the battery in the base subsystem to the components of the base subsystem and/or to the components of the upper subsystem. As noted above, such customized power regulation circuits may be configured to provide power to a subset of the set of input devices that have voltage requirements that lie within that specific range.

In some cases, the customized power regulation circuits may be configured to provide multiple regulated output voltages at relatively high power, including 19V @5A MAX (e.g., NUC power rail), 12V @5A MAX (display power rail), 12V @5A MAX (12V accessory rail), 5V @5A MAX (5V accessory rail), ADJV (0-5V @5A MAX (Adjustable accessory rail), or other output voltages. The customized power regulation circuits may also be configured to pass battery power at a sufficient level to the motor controller, fuse each of the power outputs, be capable of regulating onboard logic/operating voltages, be capable of powering off both battery and charger voltage, be capable of monitoring battery voltage and output conditions, be capable of monitoring for error conditions and faults, be capable of communicating with external chargers, be capable of stopping charger inputs on-board, be capable of monitoring printed circuit board conditions such as temperature and regulating those conditions accordingly, providing debugging options, or performing other functions. In addition to simply fusing the outputs, the customized power regulation circuits may also monitor for blown fuses automatically, thereby increasing the ease of debugging.

Furthermore, the power distribution unit 804 may be a custom printed circuit board assembly (PCBA) that is designed to supply the robot with the various power requirements it may need for different sensor arrays, controls, computing devices, inferencing hardware, and aesthetic accessories. The PCBA embodiments herein may provide power for a 36V motor controller, a 19V general computer, as well as various 5V and 12V accessories, including an adjustable rail between 0-5V configurable by a trim-potentiometer. By providing an abundance of connection points to the different accessory rails, wire harnessing may converge at the power distribution unit (PDU) enclosure, eliminating (at least in some cases) the need for unnecessary splices and custom harnessing on the modular robot. In combination with the power conversion capabilities of the PDU, the PCBA may be responsible for handling charging of the robot's onboard battery pack. By utilizing components that allow for power source bypassing, the PDU eliminates the need for an emergency charging port that was previously standard. By using a signal connection port and onboard sensor hardware, the PDU may also be configured to handle non-linear DC charging in cases where no battery management system (BMS) is present.

Figure 9A:
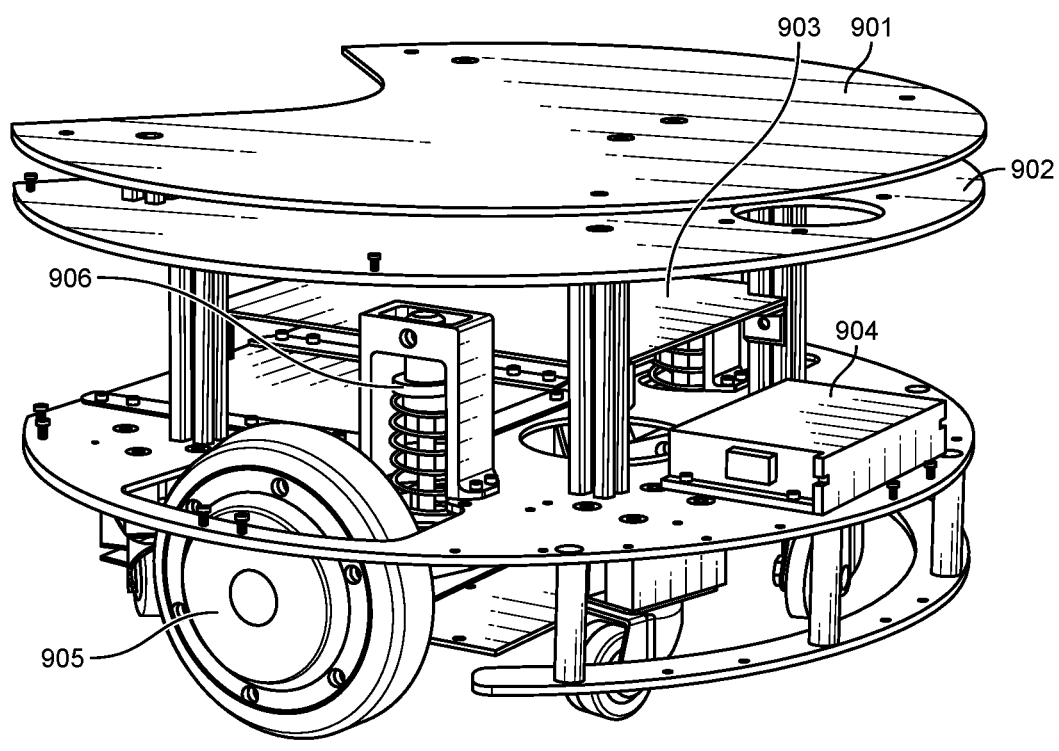
FIGS. 9A and 9B illustrate covered and uncovered embodiments of a base portion of a modular robot.
Figure 9B:
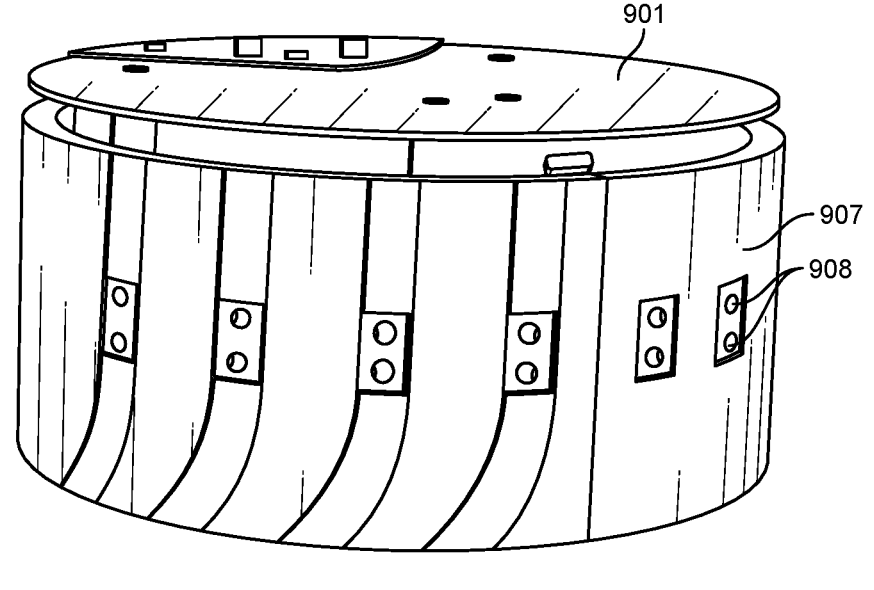

FIGS. 9A and 9B illustrate embodiments of a base subsystem 901 shown without an external covering (FIG. 9A) and with an external covering 907 (FIG. 9B). The base subsystem 901 may include wheels 905 that propel the modular robot through various environments. The wheels (and other components) may be powered by one or more batteries or PDUs 904 that may rest on various platforms 902 or 903. The base subsystem 901 may also include a suspension system 906 that helps to stabilize the robot as it travels over bumps and uneven surfaces. The base subsystem 901 may further include electronic components, including control circuits, batteries, sensors, and other components (e.g., sensors 908 in FIG. 9B). Still further, the base subsystem 901 may include platforms 902 & 903 that may accommodate the placement of other electrical or mechanical components or may interface with components of the modular upper subsystem.

In some cases, the sensors 908 in the base subsystem 901 may include multiple different edge detecting sensors mounted on different peripheral surfaces of the base subsystem 901. In such cases, the edge detecting sensors may be configured to detect physical edges of the environment. Additionally, or alternatively, the edge detecting sensors may be configured to work in combination with virtual fences to create or update environment mapping for navigation. These virtual fences may be formed in substantially any shape or size and may be changed directly or remotely by an administrator. In such cases, the administrator may send wireless updates to the modular robot to notify the robot of changes in the size, shape, or position of the virtual fence.

In some embodiments, different sensors or different groupings of sensors may be used to detect the physical obstacles. These groupings of sensors may include lidar, sonar, depth-sensing cameras, video cameras, NIR or infrared sensors, or other sensors that may detect both physical boundaries and configured software to detect virtual boundaries. Different combinations of such sensors and configured software may be used to detect physical and/or virtual boundaries in different operational environments (e.g., outdoor on a pool deck vs. indoor on a casino floor). As noted above, the boundaries of the physical or virtual fences may change over time. In such cases, the control circuits may be given updated instructions to detect the updated boundaries of the physical or virtual fences. These changes may be received and applied in real time (or substantially in real time), dynamically, or may be applied according to a preset schedule. In some cases, inputs received from certain sensors detecting physical boundaries (depth-sensing cameras or lidar) may be overridden by inputs from other sensors detecting physical boundaries (limit switches, NIR, or sonar sensors, etc.), or vice versa. Such changes may be broadcast wirelessly to a fleet of modular robots at the same time and may be received by those robots, interpreted and implemented according to policy.

Figure 10B:
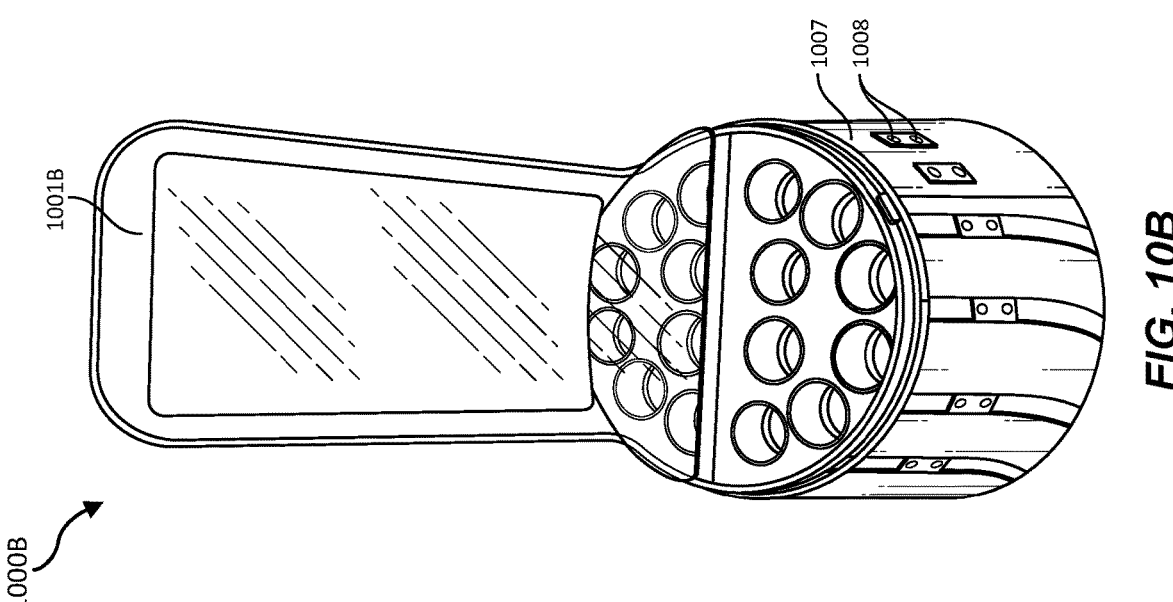
FIGS. 10A and 10B illustrate different embodiments of modular top portions of a modular robot.
Figure 10A:
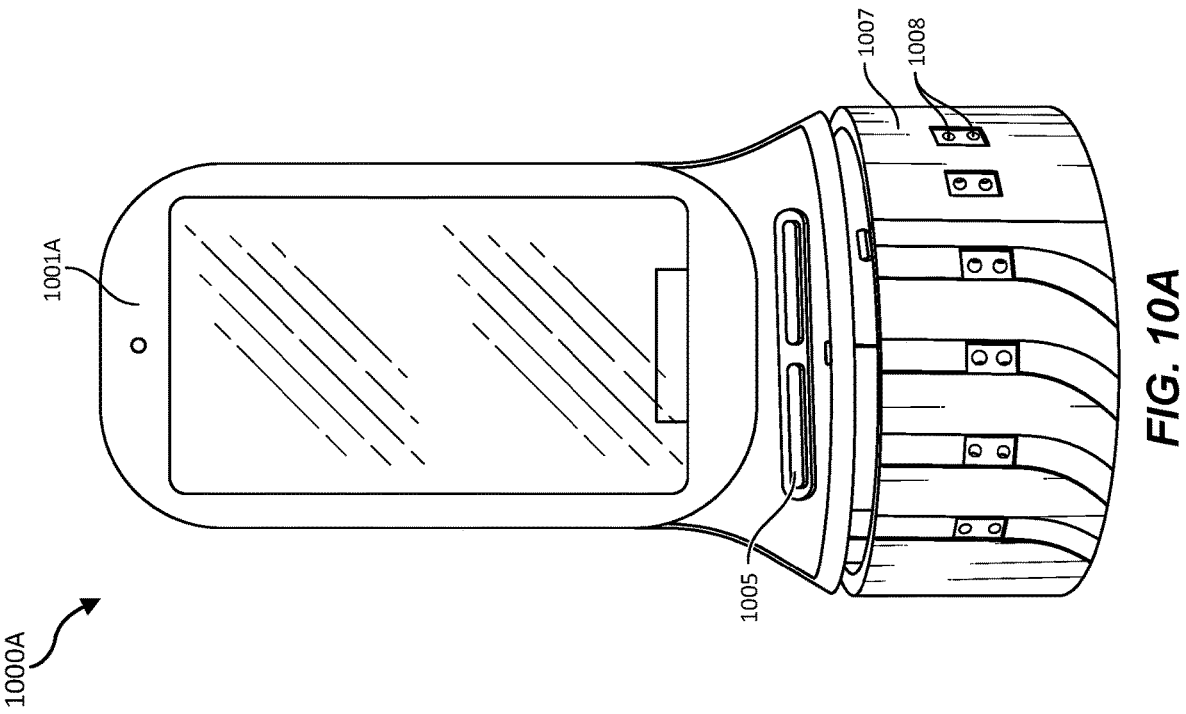

FIGS. 10A and 10B illustrate embodiments in which different upper subsystems are used in combination with the same base subsystem. In embodiment 1000A of FIG. 10A, for example, an upper subsystem 1001A may be implemented with a base subsystem 1007. The upper subsystem 1001A may include input devices 1005 such as physical buttons that allow users to interact with the upper subsystem. The input signals received at the upper subsystem 1001A may be used to control movements of the modular robot by coordinating the received input signals with the sensor inputs of the base subsystem 1007 (e.g., inputs from sensors 1008). Embodiment 1000B includes a modular robot with a different upper subsystem 1001B that is used in combination with the same base subsystem 1007. The same set of sensors 1008 may be coordinated with input signals from the upper subsystem 1001A to provide drinks or perform other functions that are appropriate for the robot's current environment. As will be recognized, many different modular upper portions may be used with the base subsystem 1007, and each of these upper subsystems may include its own set of sensors (e.g., mounted on one or more peripheral surfaces) that is electrically connected to and whose inputs are coordinated with those of the base subsystem to navigate and perform specified functions in the robot's various designated environments.

In some cases, an apparatus corresponding to the above-described system may be provided. The apparatus may include a base subsystem that includes a mobility device configured to move the base subsystem along a surface and a set of sensors physically coupled to the base subsystem and communicatively coupled to the mobility device in a manner than enables the system to navigate two or more different operational environments. The apparatus may further include an upper subsystem that is coupled to the base subsystem and that includes a set of input devices and a control circuit programmed to coordinate input received from the set of input devices with signals from the set of sensors to provide a user with a gaming experience within a specific operational environment of the two or more different operational environments.

In some embodiments, a modular robot may be provided. The modular robot may include a base subsystem that has a mobility device configured to move the base subsystem along a surface and a set of sensors physically coupled to the base subsystem and communicatively coupled to the mobility device in a manner that enables the system to navigate two or more different operational environments. The modular robot may also include an upper subsystem that is coupled to the base subsystem and that includes a set of input devices. Still further, the modular robot may include a control circuit programmed to coordinate input received from the set of input devices with signals from the set of sensors to provide a user with a gaming experience within a specific operational environment of the two or more different operational environments.

Accordingly, the embodiments described herein may provide systems and apparatuses, including a modular robot, that have upper and lower subsystems designed to perform specific functions. These upper and lower subsystems may have specific sensors or arrays of sensors, each with specific power requirements, that allow the modular robot to perform designated functions in certain environments. In some cases, different sets of sensors are provided in the upper and lower subsystem to allow the modular robot to perform one function in one environment, and other functions in a different environment. These functions may include providing different types of gaming experiences to users in various gaming environments. The modular robots may be designed for safe use around unpredictable users and may exhibit versatility and durability in volatile environments.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system comprising:
   a base subsystem comprising:
      a mobility device configured to move the base subsystem along a surface;
      a set of sensors physically coupled to the base subsystem and communicatively coupled to the mobility device in a manner than enables the system to navigate two or more different operational environments; and
      a battery;
   an upper subsystem that is coupled to the base subsystem and that comprises:
      a set of input devices; and
      one or more power regulation circuits that receive and distribute power from the battery in the base subsystem, wherein the one or more power regulation circuits are configured to provide power to a subset of the set of input devices that have voltage requirements within a specified range; and
   a control circuit programmed to coordinate input received from the set of input devices with signals from the set of sensors to provide a user with a gaming experience within a specific operational environment of the two or more different operational environments.

2. The system of claim 1, wherein the set of input devices on the upper subsystem comprises: a second set of sensors, one or more display devices, one or more touchscreen devices, or one or more physical buttons.

3. The system of claim 2, wherein the second set of sensors includes at least one sensor that is different from the set of sensors in the base subsystem.

4. The system of claim 3, further comprising a second, different upper subsystem that includes a third, different set of sensors, wherein the third, different set of sensors includes at least one sensor that is different from both the sensors in the set of sensors and in the second set of sensors.

5. The system of claim 1, wherein the base subsystem further includes:

a charge controller that is configured to regulate charging and discharging of the battery.

6. The system of claim 1, wherein the one or more customized power regulation circuits that provide power to the subset of input devices having specific voltage requirements include current-limiting fuses.

7. The system of claim 6, wherein the control circuit is configured to at least partially regulate power to the subset of input devices.

8. The system of claim 1, wherein the upper subsystem is grounded to the base subsystem to avoid short connections in the upper subsystem.

9. An apparatus comprising:

a base subsystem comprising:

a mobility device configured to move the base subsystem along a surface;

a set of sensors physically coupled to the base subsystem and communicatively coupled to the mobility device in a manner than enables the apparatus to navigate two or more different operational environments; and a battery;

an upper subsystem that is coupled to the base subsystem and that comprises:

a set of input devices; and one or more power regulation circuits that receive and distribute power from the battery in the base subsystem, wherein the one or more power regulation circuits are configured to provide power to a subset of the set of input devices that have voltage requirements within a specified range; and a control circuit programmed to coordinate input received from the set of input devices with signals from the set of sensors to provide a user with a gaming experience within a specific operational environment of the two or more different operational environments.

10. The apparatus of claim 9, wherein the set of sensors in the base subsystem includes a plurality of edge detecting sensors mounted on one or more peripheral surfaces of the base subsystem.

11. The apparatus of claim 10, wherein the edge detecting sensors and software are configured to detect physical edges or dynamic physical obstacles within the two or more different operational environments.

12. The apparatus of claim 11, wherein the boundaries of the virtual fences change over time, and wherein the configured software and edge detecting sensors are configured to detect the changed boundaries of the virtual fence and the dynamic physical obstacles.

13. The apparatus of claim 12, wherein the boundaries of the virtual fences change according to a specified schedule.

14. The apparatus of claim 9, wherein the two or more different operational environments comprise: a casino lobby, a bingo hall, a movie theater, a casino floor, a hotel lobby, a storefront, a restaurant, or a hotel guest room.

15. The apparatus of claim 9, wherein the gaming experience comprises at least one of: providing an electronic game to the user, providing communication with an external entity, providing a food or beverage to the user, or providing gaming chips to the user.

16. The apparatus of claim 15, wherein providing a food or beverage to the user comprises providing an adult beverage that is locked in an electronically unlockable container that is part of the upper subsystem, wherein the electronically unlockable container is unlockable solely by the user.

17. A modular robot comprising:

a base subsystem comprising:

a mobility device configured to move the base subsystem along a surface;

a set of sensors physically coupled to the base subsystem and communicatively coupled to the mobility device in a manner than enables the modular robot to navigate two or more different operational environments; and a battery;

an upper subsystem that is coupled to the base subsystem and that comprises:

a set of input devices; and one or more power regulation circuits that receive and distribute power from the battery in the base subsystem, wherein the one or more power regulation circuits are configured to provide power to a subset of the set of input devices that have voltage requirements within a specified range; and a control circuit programmed to coordinate input received from the set of input devices with signals from the set of sensors to provide a user with a gaming experience within a specific operational environment of the two or more different operational environments.

* * * * *